United States Patent [19]

Limb

[11] Patent Number: 4,782,484
[45] Date of Patent: Nov. 1, 1988

[54] ENCODING AND DECODING SIGNALS FOR TRANSMISSION OVER A MULTI-ACCESS MEDIUM

[75] Inventor: John O. Limb, Colchester, England

[73] Assignee: Bell Communications Research, Inc., Livingston, N.J.

[21] Appl. No.: 853,619

[22] Filed: Apr. 18, 1986

[51] Int. Cl.⁴ .............................. H04J 3/06; H04L 7/00
[52] U.S. Cl. ..................................... 370/100; 375/106; 375/111
[58] Field of Search ................... 370/106, 101, 85, 48, 370/4, 86, 87; 100; 375/112, 117, 111, 113, 95, 106; 340/348, 354; 371/55

[56] References Cited

U.S. PATENT DOCUMENTS

| | | |
|---|---|---|
| 3,200,198 | 8/1965 | McRae . |
| 3,363,059 | 1/1968 | Cummins ............................ 375/117 |
| 3,390,232 | 6/1968 | Jager et al. . |
| 3,593,140 | 7/1971 | Kaneko . |
| 3,749,845 | 7/1973 | Fraser ................................. 370/99 |
| 4,298,978 | 11/1981 | Nakamura ............................ 370/48 |
| 4,439,763 | 3/1984 | Limb ................................ 340/825.5 |
| 4,486,740 | 12/1984 | Seidel ................................. 340/347 |
| 4,606,056 | 8/1986 | Perloff ................................. 370/48 |

FOREIGN PATENT DOCUMENTS

| | | |
|---|---|---|
| 3407450 | 2/1984 | Fed. Rep. of Germany . |
| 1033069 | 7/1963 | United Kingdom . |
| 1358849 | 7/1974 | United Kingdom ................ 375/117 |

Primary Examiner—Douglas W. Olms
Assistant Examiner—Melvin Marcelo
Attorney, Agent, or Firm—James W. Falk; John T. Peoples

[57] ABSTRACT

An encoder method for processing an input data signal to produce binary coded data frames and to provide for synchronized, high-speed operation partitions the incoming data into contiguous frames composed of a plurality of bit positions. For each frame, a synchronizing signal comprising a pulse in the first bit position and no pulse in the midpoint bit position is propagated over the channel. Any station gaining access to the channel propagates its data samples in the remaining positions in each frame. Thus, the channel signal includes a component which is a subharmonic of the bit rate and this subharmonic is used to derive a synchronizing signal in a decoder.

The decoder method for detecting the samples in the contiguous frames includes the steps of processing the synchronizing signal to produce signals at both the frame and bit rates and extracting a sampling signal in correspondence to the locations of the data samples in the frames. In order to achieve a preselected end-to-end transmission rate in the overall system, the rate of the signal propagated between encoder (400) and decoder (200) is increased to compensate for the interleaved synchronizing signal.

4 Claims, 6 Drawing Sheets

ENCODING AND DECODING SIGNALS FOR TRANSMISSION OVER A MULTI-ACCESS MEDIUM

FIELD OF THE INVENTION

This invention relates generally to a digital communication system having numerous stations interconnected by a transmission medium and, more particularly, to the encoding and decoding of signals processed by the stations in order that the stations may concurrently share the medium.

BACKGROUND OF THE INVENTION

Local area networks are presently utilized, for example, to interconnect such devices as computers, terminals, work stations, printers and telephones within an office environment. For the effective operation of local area networks, the devices are generally configured to passively connect to the transmission medium interconnecting the devices. Due to this passive connection, nearly all failures occurring within the devices do not interfere with signals propagating on the medium and, therefore, failures or outages of a device very rarely affect the correct operation of the remaining system.

Examples of conventional local area network arrangements that utilize passively connected devices include those discussed in U.S. Pat. No. 4,063,220, issued in December, 1977 and U.S. Pat. No. 4,439,763, issued in March, 1984. The first reference describes the arrangement now generally referred to as Ethernet, whereas the second reference describes the so-called Fasnet system. Since Fasnet is representative of conventional systems, it is now discussed in some detail to illustrate the characteristics of local area network arrangements.

Fasnet is typically deployed in office environments requiring efficient system operation at very high transmission speeds. This is achieved by configuring a station at one end of a unidirectional transmission medium to propagate a synchronizing signal or waveform to the remaining stations attached to the medium. According to the protocol described in U.S. Pat. No. 4,439,763, attaching stations are arranged to determine when it is appropriate to transmit coded digital information on the shared medium. The information provided by each station is added to the energy of the synchronizing information already on the transmission medium. A failure of one station generally results in the inability to propagate a coded signal from the inoperative station; the remaining stations operate normally.

One particular code oftentimes utilized in the conventional systems, including Fasnet, is the so-called bipolar code or alternate mark inversion code. Such a code is selected so as to reduce the DC component contained within the overall transmitted waveform. This modulation or coding scheme is appropriate for communication over a medium such as a coaxial cable where it is not difficult to construct a transmitter and receiver pair that linearly transforms the information applied to the medium. However, a bipolar-type signal is a three-level signal. In an optical communication bus realization of a local area network, it is basically very difficult to arrange for the transmitting device, such as a light emitting diode or laser diode, to generate a three-level signal since the source is inherently a two-state, ON-OFF light source.

For this reason, in a point-to-point optical transmission system, it is common in the art to employ a two-level modulation scheme known as Manchester encoding. The digital signal is modulated in such a way that a transition from high-to-low or from low-to-high occurs at the center of every bit period. The frequently occurring bit transitions enable the recovery of a clock signal to aid in the decoding of the digital information conveyed by the waveform propagated on the medium. The Manchester scheme, however, is not appropriate for synchronous multiple access systems because when a station ceases transmitting, the synchronizing information is removed from the medium and the stations attached to the medium lose synchronism. Asynchronous operation is possible, but this is appropriate for only low speed communication. At high speeds, the time required for a station to reestablish synchronization can be a significant fraction of the period of time taken by a station to transmit a packet of information.

SUMMARY OF THE INVENTION

The shortcomings and limitations of conventional encoding-decoding techniques for optical local area network implementations are obviated with the present invention of an encoder-decoder arrangement utilizing only two signal levels and providing for synchronized, high-speed operation.

In accordance with an illustrative embodiment of the present invention, a digital encoder partitions a packet interval into contiguous frames composed of a plurality of bit positions. For each frame, a synchronizing bit is propagated in the first bit position. The incoming data bits are then assigned to the remaining positions in each frame, except the position corresponding to the midpoint of the frame, and pulses or no pulses are propagated in the remaining positions in correspondence to the incoming data bits. With this coding, the signal on the medium has an embedded frequency component which is a submultiple of the data rate. The energy at the submultiple frequency is used to derive a synchronizing signal in a decoder.

The decoder, in accordance with an illustrative embodiment of the present invention, derives a synchronizing signal from the embedded subharmonic of the data frequency by processing the subharmonic to produce a frame rate signal and, in turn, by processing the frame rate signal to yield a data rate signal. A sampling signal is derived from the frame rate and data rate signals and the incoming frames are sampled with the sampling signal to produce the desired output samples.

The organization and operation of this invention will be better understood from a consideration of the detailed description of the illustrative embodiments thereof, which follow, when taken in conjunction with the accompanying drawing.

DETAILED DESCRIPTION

Figure 1:
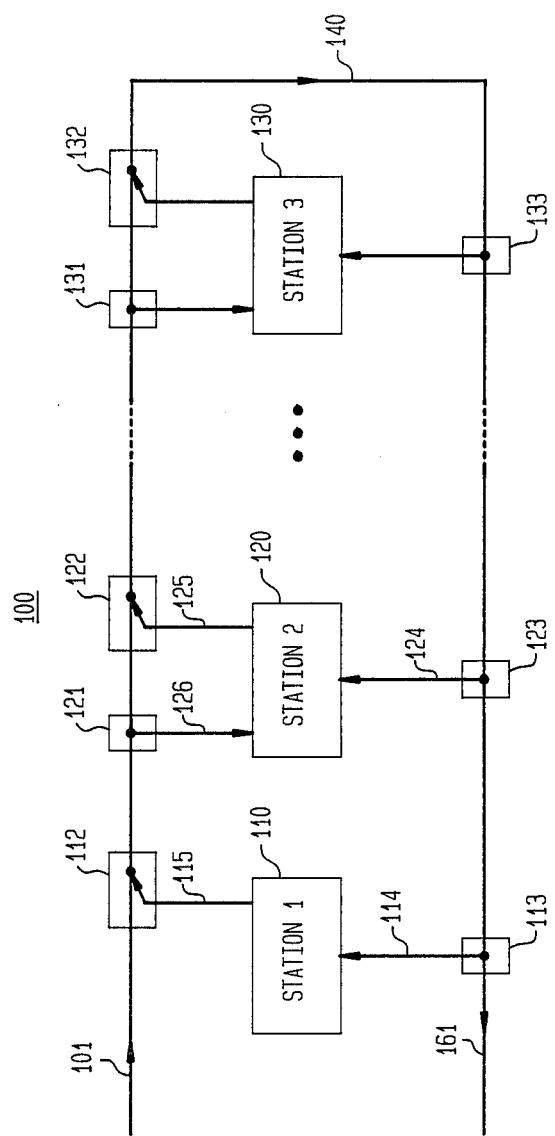
FIG. 1 is a block diagram of a multiple-access communication system configured in accordance with the present invention.
Figure 2:
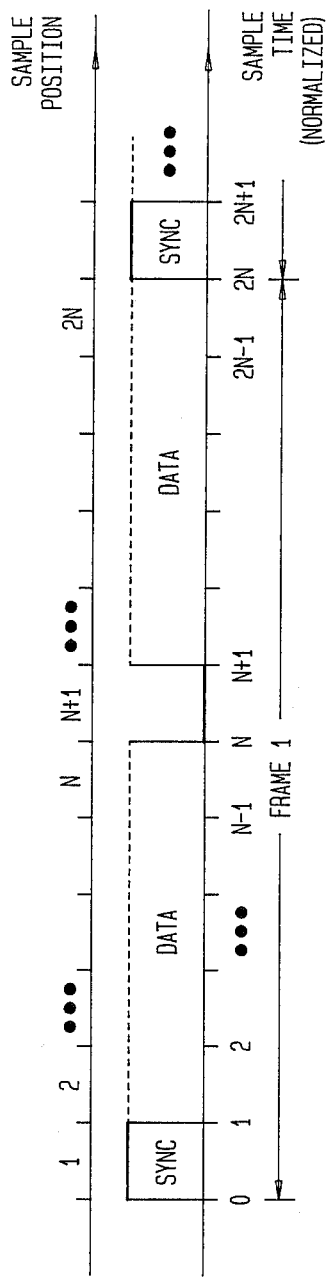
FIG. 2 is an illustrative synchronizing signal provided to the unidirectional line by the synchronizing station.
Figure 3:
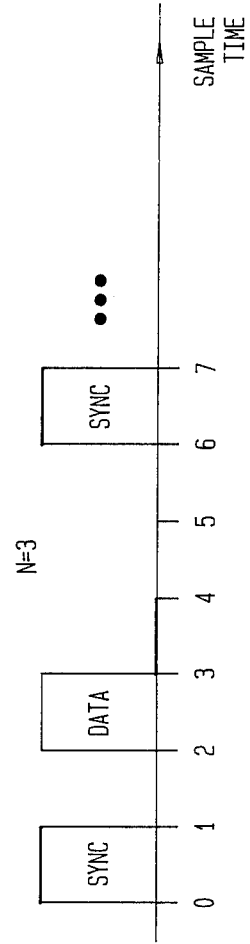
FIG. 3 is an exemplary data frame transmitted by one of the stations of FIG. 1.

With reference to FIG. 1, system 100 is configured as a Fasnet-type arrangement wherein station 110 provides a synchronizing signal to unidirectional line 101 via directional coupler 112. An exemplary synchronizing signal combined with an information bearing signal in accordance with the present invention is depicted in FIG. 2. As shown in FIG. 2, a sync pulse is always propagated on line 101 by station 110 every 2N samples on a normalized time basis (every 2NT seconds on an unnormalized time basis where 1/T is the system transmission rate). Any station 110, 120 or 130 that determines it has permission to broadcast on line 101 may write coded, information-bearing data in all sample positions except sample positions 1 and N+1 for the first frame, positions 2N+1 and 3N+1 for the second frame, and so forth, that is, sample positions $2Nm+1$ and $2Nm+N+1$ for $m=0,1,2,\ldots$ An exemplary first data frame for the case N=3 is shown in FIG. 3. In FIG. 3, the binary data sequence '0100' is broadcast during the time period (0-6) in the respective intervals (1,2),(2,3),(4,5) and (5,6). The synchronizing pulse is broadcast during the interval (0,1) by station 110 and no station is permitted to transmit a pulse in the interval (3,4).

With the constraints of (i) requiring a pulse to be transmitted every 2NT seconds and of (ii) not allowing any pulses, even data pulses, in the intervals $[(2Nm+N)T,(2Nm+N+1)T]$ for $m=0,1,2,\ldots$, the waveform on line 101 has been forced to have an embedded frequency component of $\frac{1}{2}NT$. If $f=1/T$ is the data transmission rate, then these constraints have induced a submultiple frequency f/2N to appear in the transmitted data signal. The energy of f/2N may be utilized to derive a synchronizing signal in the receiver portion of each station 110, 120 or 130.

Figure 4:
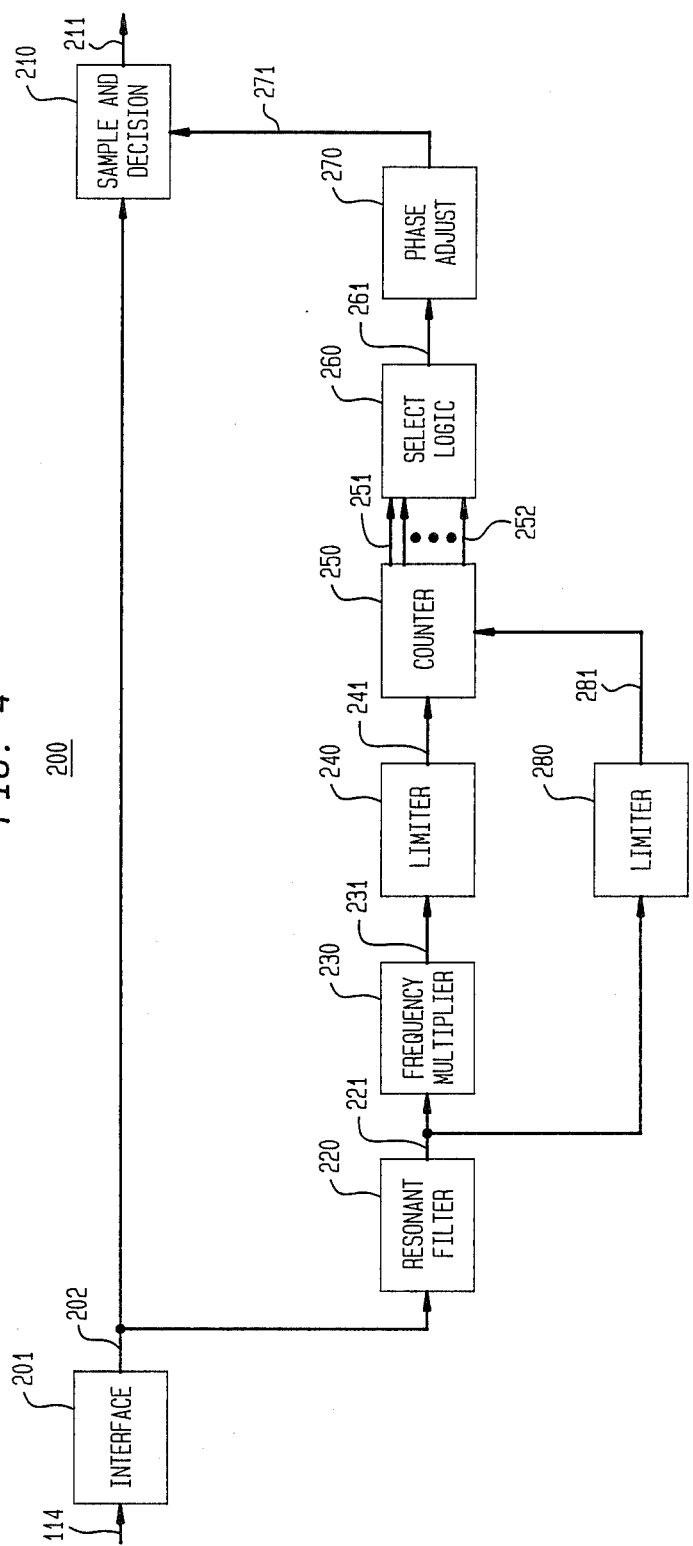
FIG. 4 depicts, in block diagram form, a receiver arranged in accordance with the present invention.

An illustrative embodiment of that portion of each station 110, 120 or 130 comprising the signal detector is depicted in FIG. 4. The input to detector 200 of, say, station 110, is provided on line 114 emanating from tap 113 of FIG. 1. Line 114 serves as the input to interface circuit 201, which provides conventional signal buffering, automatic gain control and frequency equalization operations. The output of circuit 201 appears on lead 202 and serves as inputs to both sample-and-decision circuit 210 and filter 220. The cascade of circuits 220,230,240,250,260 and 270, as well as circuit 280 coupling the output of circuit 220 to the input of circuit 250, are arranged to extract the clock signal for use in enabling sample-and-decision circuit 210 at the appropriate instants of time. In the data signal shown in FIG. 3, a sampling signal is required in essentially the center of the intervals (1,2), (2,3), (4,5) and (5,6).

The conditioned signal on lead 202 is applied to resonant filter circuit 220, which basically comprises a high-Q filter tuned to the frequency f/2N, a submultiple of the data rate f. The output of circuit 220, on lead 221, provides the input to frequency multiplier circuit 230 and limiter 280. Multiplier 230 produces at its output, on lead 231, the 2Nth harmonic of the input waveform.

The waveform present on lead 231 is a sinusoid with a frequency f, the original sample frequency. Limiter 240 is coupled to multiplier 230 and this limiter squares the signal on lead 231 to produce an appropriate waveform at the appropriate level to trigger counter 250. It is important that counter 250 commences counting at the same given point in the 2N cycle of samples. This is achieved by limiting the output of filter 220 in limiter 280. The output of limiter 280, on lead 281, has a fundamental frequency of f/2N, and lead 281 provides the reset signal to counter 250. Select logic circuit 260, coupled to counter 250, comprises a gate arrangement configured to produce an output pulse on lead 271 for all samples except the first and N+1 samples in a 2N cycle. The resulting series of pulses, on lead 261, is phase-adjusted in adjuster 270. The output of phase adjuster 270, on lead 271, serves as a second input to sample-and-decision circuit 210. The data signals detected in circuit 210 appear on lead 211. These signals generally are not equally spaced since the first and N+1 samples in each cycle are bypassed. Circuit 210 may be arranged to provide for equally spaced data by incorporating appropriate rate change circuitry such as a shift register (not shown).

Phase adjust circuit 270 is used to position the sampling pulses since the signal processing by the circuits forming the clock extraction circuitry may introduce phase changes. Adjuster 270 may, for example, comprise a delay line. Alternatively, the phase correction circuitry could be positioned on the output side of resonant filter 220 since a delay of the signal at the output of filter 220 is equivalent to a delay on the output side of logic circuit 260. In this case, the small adjustments in phase could be made to a sinewave signal using a sinewave adjusting circuit well-known in the art. Phase adjustment occurs during a training period prior to actual data transmission.

Figure 5:
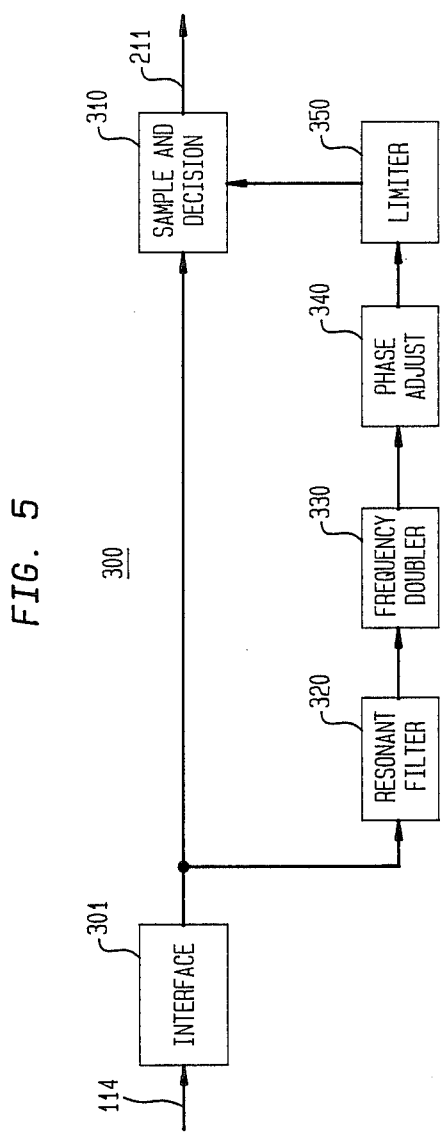
FIG. 5 depicts a simplified receiver for the case of N=2.

FIG. 5 depicts receiver 300, which is a somewhat simplified realization of receiver 200 when N=2. Because sample-and-decision circuit 310 will now select every second sample of the incoming waveform, counter 250 and logic circuit 260 of FIG. 4 may now be replaced by frequency doubling circuit 330. If it is further presumed that circuit 310 is enabled by a clock transition from 0 to 1, phase adjust circuit 340 and limiter 350 can be used to derive the appropriate signal to sample the signal serving as the input to circuit 310.

Figure 6:
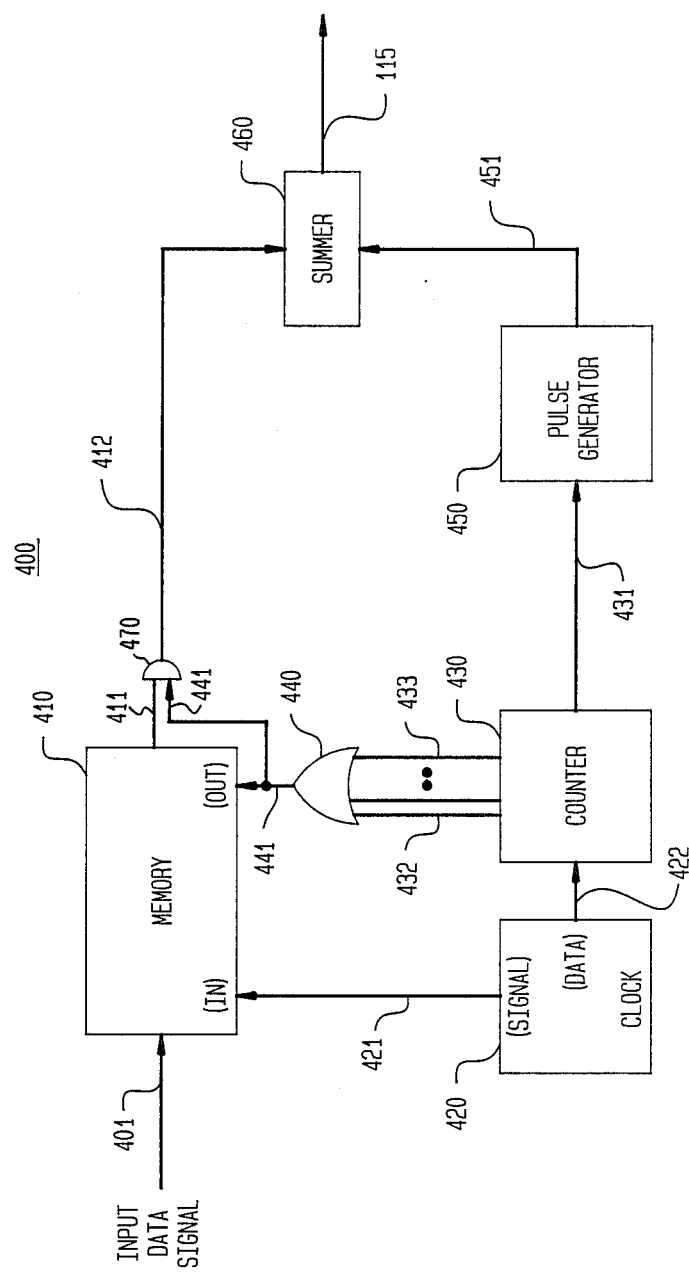
FIG. 6 depicts, basically in block diagram form, a synchronizing transmitter arranged in accordance with the present invention.

An illustrative embodiment of that portion of synchronizing station 110 comprising the signal transmitter is depicted in FIG. 6. The input data signal provided to transmitter 400 of station 110 appears on lead 401. If the signal on medium 101 of FIG. 1 is propagated with pulses of time duration T, then data on lead 401 is stored in memory 410 at a signal rate of at least (N−1)/NT for a frame composed of 2N samples. Clock 420 provides both the signal rate or shift-in signal, on lead 421, and the data rate (1/T) signal, on lead 422.

Counter 430 receives its input from clock 420 via lead 422 and counter 430 provides two types of outputs. First, on lead 431, a signal is transmitted every 2N samples of the data rate and this signal serves to enable pulse generator 450. The output of generator 450, on lead 451, is the synchronizing pulse for the system; lead 451 serves as one input to summer 460. The second output signal from counter 430 is a set of pulses corresponding to the data intervals in each frame of 2N samples. These pulses, on leads 432–433, serve as inputs to OR gate 440; the output of gate 440, on lead 441, is coupled to the shift-out port of memory 410. The signal on lead 441 provides memory 410 with a shift-out pulse for all samples except the first and N+1 samples in a 2N cycle. The output samples from memory 410 appear on lead 411, which serves as one input to AND gate 470. The other input to gate 470 is provided by lead 441. The output of gate 470, on lead 412, serves as the second input to summer 460. The output of summer 460, on lead 115, is coupled to medium 101 via directional tap 112 (FIG. 1).

The combination of circuits 410, 420 and 430 provides a rate-increasing function in that data input is at the rate (N−1)/NT whereas data output occurs at rate 1/T.

Figure 7:
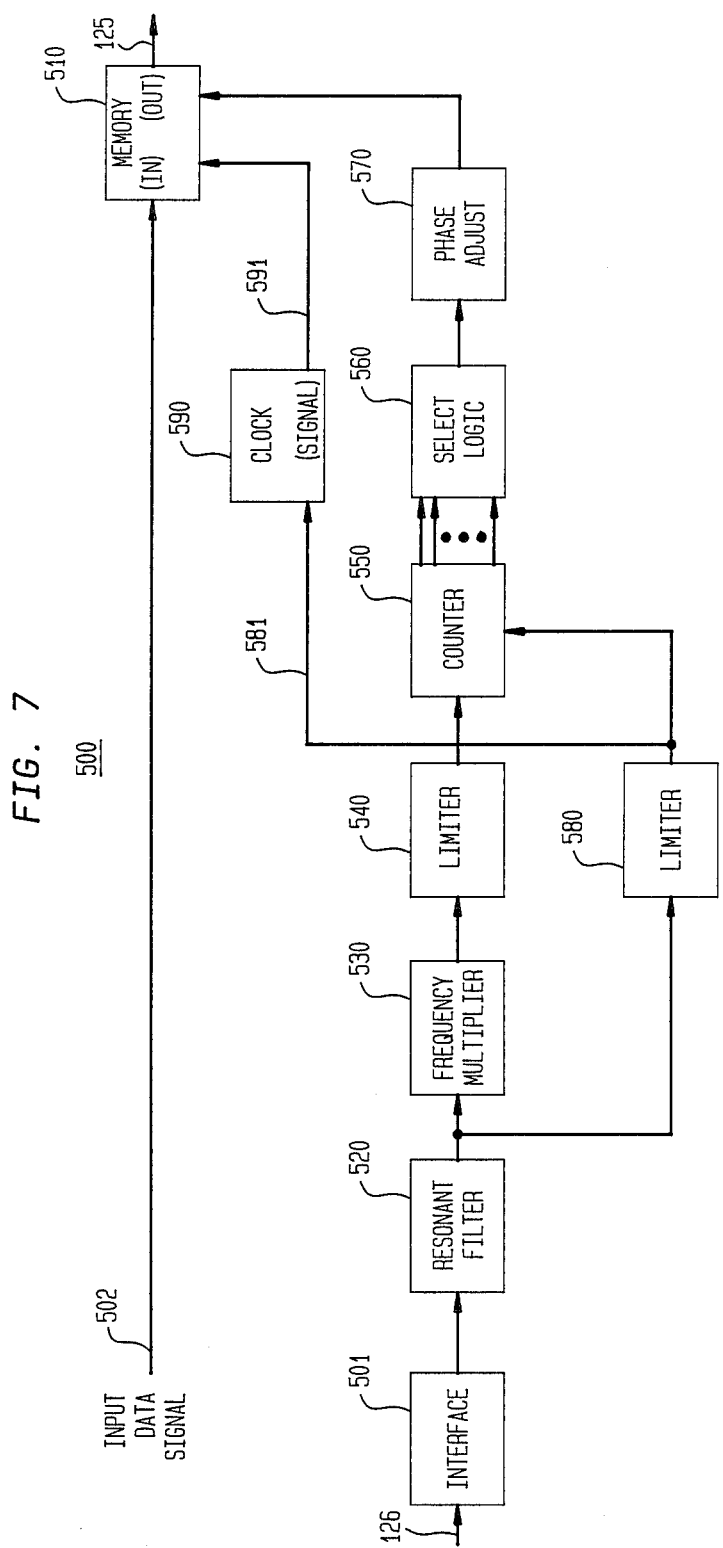
FIG. 7 depicts, in block diagram form, a controlled transmitter.

The transmitting portions of the so-called controlled stations, as exemplified by stations 120 and 130, do not have an independent shift-out clock, but rather derive the synchronizing information from line 101 the way receiver 200 of FIG. 4 derives the sync signal from line 161. FIG. 7 depicts one controlled transmitter. Circuits 501 and 520–580 perform in essentially the same manner as circuits 201 and 220–280 of FIG. 4. Memory 510 of FIG. 7 is similar to shift memory 410 of FIG. 6. Clock 590 in FIG. 7 provides the shift-in signal via lead 591. Clock 590 generates 2N-2 equally spaced pulses every time it receives a zero-to-one signal transition on lead 581. Lead 581 enables clock 590 at the same time that counter 550 is reset. In this way, the shift-in and shift-out operations to memory 510 may also be synchronized.

It is to be further understood that both the encoder and decoder, and associated methodology, described herein is not limited to specific forms disclosed by way of example and illustration, but may assume other embodiments limited only by the scope of the appended claims.

What is claimed is:

1. A method for decoding incoming channel frames, each of said frames comprising a plurality of bit positions having a pulse in the first of said positions, no pulse in the position corresponding to the midpoint of said positions, and data samples occupying the remaining ones of said positions, wherein the duration of one position determines a data rate, said method characterized by the steps of
    filtering said incoming frames to provide a first sinusoid having a frequency given by the frame rate,
    frequency multiplying said first sinusoid to produce a second sinusoid having a frequency given by said data rate,
    deriving a sampling waveform from said second sinusoid, said waveform comprising sampling signals located at essentially the midpoints of all the bit positions except the first position and the midpoint position, and
    sampling said each of said frames with said sampling waveform to obtain said data samples.

2. Circuitry for decoding incoming channel frames, each of said frames composed of a plurality of data positions and having an embedded synchronizing signal comprising a signal in the first of said positions and no signal in the position corresponding to the midpoint of said positions, and data samples filling the remaining ones of said positions, said circuitry characterized by
    an interface circuit, coupled to said channel, for receiving and conditioning said frame data,
    a sampling signal generation circuit comprising
        a filter, coupled to said interface device, for providing a version of said synchronizing signal occurring at the frame rate,
        a frequency multiplier, coupled to said filter, for producing the data rate from said frame rate,
        a first limiter, coupled to said multiplier, for generating a first sequence of pulses at said data rate,
        a second limiter, coupled to said filter, for generating a second sequence of pulses at said frame rate,
        a counter, responsive to said first and second limiters, for supplying a set of pulses in correspondence to the number of said data positions,
        select logic circuitry, coupled to said counter, for producing a sampling signal corresponding to said remaining ones of said positions, and
        phase adjust circuitry, coupled to select logic, for positioning said sampling signal in essentially the midpoint of the associated data positions, and
    a sample-and-decision circuit, coupled to said phase-adjust circuit and said interface circuit, for sampling said incoming frames to produce said data samples.

3. A decoder for detecting data samples from incoming channel frames, each of said frames comprising four-bit positions wherein the first bit represents a logic one, the third bit represents a logic zero and the second and fourth bits contain contiguous ones of said data samples, said decoder comprising
    interface circuitry for receiving and processing said frames to produce a detected signal having a frequency component equal to the frame frequency,
    a resonant circuit, coupled to said interface circuitry, for filtering said detected signal to produce a first sinusoidal signal having a frequency equal to said frame frequency,
    a frequency doubler, coupled to said resonant circuit, for converting said first sinusoidal signal to a second sinusoidal signal having a frequency of twice said frame frequency,
    a phase adjuster, coupled to said doubler, for positioning the maxima of said second sinusoidal signal at essentially the midpoints of said second and fourth bit positions,
    a limiter, coupled to said phase adjuster, for converting said adjusted, second sinusoidal signal to a sampling signal for sampling said second and fourth bit positions, and
    sample and decision circuitry, responsive to said interface circuitry and said limiter, for sampling said detected signal with said sampling signal to produce said contiguous data samples.

4. In a system comprising a plurality of stations interconnected by a unidirectional medium, a method for communicating data frames over said medium, each of said frames composed of a plurality of bit positions, said method comprising the steps of
    designating the upstream station as a synchronizing station,
    generating within said synchronizing station and propagating over said medium a synchronizing waveform having a signal in the first of said positions and no signal in the midpoint of said positions,
    for the station gaining access to the medium, generating, in synchronism with said synchronizing waveform, pulses or no pulses in the remaining ones of said positions in correspondence to the data samples produced by said accessing station, within each of said stations, receiving and processing said data frames by filtering said incoming frames to produce a first sinusoid having a frequency given by the frame rate and by frequency multiplying said first sinusoid to produce a second sinusoid having a frequency given by the bit rate, and wherein said synchronizing waveform is derived from said first and second sinusoids, and generating a sampling waveform from said second sinusoid, said sampling waveform comprising sampling signals located at essentially the midpoints of all of said positions except the first position and the midpoint position, and sampling each of said frames with said sampling waveform to obtain said data samples propagated by said accessing station.

* * * * *